United States Patent
Li et al.

(10) Patent No.: US 11,812,438 B2
(45) Date of Patent: Nov. 7, 2023

(54) SPECIFYING A TRANSMISSION-TIME LIMIT FOR UPLINK MULTI-USER COMMUNICATION

(71) Applicant: Apple Inc., Cupertino, CA (US)

(72) Inventors: Guoqing Li, Campbell, CA (US); Vijay Kumar Ramamurthi, Milpitas, CA (US); Yaranama Venkata Ramana Dass, Milpitas, CA (US); Ding Li, Newark, CA (US)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 16/804,169

(22) Filed: Feb. 28, 2020

(65) Prior Publication Data

US 2020/0288496 A1    Sep. 10, 2020

Related U.S. Application Data

(60) Provisional application No. 62/814,183, filed on Mar. 5, 2019.

(51) Int. Cl.
*H04W 72/23* (2023.01)
*H04B 7/0452* (2017.01)
(Continued)

(52) U.S. Cl.
CPC .......... *H04W 72/23* (2023.01); *H04B 7/0452* (2013.01); *H04L 5/0007* (2013.01);
(Continued)

(58) Field of Classification Search
USPC ....................................................... 370/329
See application file for complete search history.

(56) References Cited

U.S. PATENT DOCUMENTS

| | | |
|---|---|---|
| 7,668,128 B1 | 2/2010 | Benveniste |
| 10,028,272 B2 | 7/2018 | Seok |

(Continued)

FOREIGN PATENT DOCUMENTS

| | | |
|---|---|---|
| CN | 106134122 | 11/2016 |
| CN | 106559900 A * | 4/2017 |

(Continued)

OTHER PUBLICATIONS

First Office Action for CN Patent Application No. 202010144425.5; 11 pages; dated Oct. 19, 2022.

*Primary Examiner* — Jeffrey M Rutkowski
*Assistant Examiner* — Luna Weissberger
(74) *Attorney, Agent, or Firm* — Kowert, Hood, Munyon, Rankin & Goetzel, P.C.

(57) ABSTRACT

An electronic device that selectively provides a trigger frame is described. During operation, the electronic device may receive a frame from a recipient electronic device, where the frame includes information that specifies a maximum uplink multi-user transmit duration of the recipient electronic device. Moreover, the electronic device may selectively provide the trigger frame to the recipient electronic device that specifies an uplink OFDMA frame or an uplink MIMO frame associated with the recipient electronic device. The trigger frame may be selectively provided when a transmit time corresponding to the uplink OFDMA frame or the uplink MIMO frame is less than or equal to the maximum uplink multi-user transmit duration.

20 Claims, 10 Drawing Sheets

(51) Int. Cl.
*H04L 5/00* (2006.01)
*H04W 72/1268* (2023.01)
*H04W 72/02* (2009.01)
*H04W 72/21* (2023.01)

(52) U.S. Cl.
CPC .......... *H04L 5/0023* (2013.01); *H04L 5/0037* (2013.01); *H04W 72/1268* (2013.01); *H04W 72/21* (2023.01)

(56) References Cited

U.S. PATENT DOCUMENTS

| | | | |
|---|---|---|---|
| 10,285,187 B2 | 5/2019 | Ding | |
| 2011/0164597 A1* | 7/2011 | Amini | H04L 1/0045 370/310 |
| 2015/0146654 A1* | 5/2015 | Chu | H04L 1/1887 370/329 |
| 2016/0330755 A1* | 11/2016 | Ding | H04W 72/23 |
| 2018/0014325 A1 | 1/2018 | Dvory | |
| 2019/0342917 A1 | 11/2019 | Liu | |
| 2020/0344695 A1* | 10/2020 | Wang | H04W 52/0219 |

FOREIGN PATENT DOCUMENTS

| | | |
|---|---|---|
| CN | 108029143 | 5/2018 |
| CN | 108293206 | 7/2018 |
| CN | 108604961 | 9/2018 |
| WO | 2017044529 | 3/2017 |

* cited by examiner

| AC CONSTRAINT 1110 | RDG/MORE PPDU 1112 | SRU PPDU 1114 | RESERVED BITS 1116 | MAX. UPLINK OFDMA TRANS. DURATION 1118 |

| REQUEST TYPE 1210 | MAX. UPLINK OFDMA TRANS. DURATION 1212 |

| ACTION TYPE 1310 | REQUEST TYPE 1312 | PARAMETER INFO. 1314 |

| RECEIVER NSS 1410 | CHANNEL WIDTH 1412 | UPLINK MULTI-USER DISABLE 1414 | TRANSMIT NSTS 1416 | ER SINGLE-USER DISABLE 1418 | DOWNLINK MULTI-USER MIMO RESOUND RECOMM. 1420 | UPLINK MULTI-USER DATA DISABLE 1422 |

FIG. 14

SPECIFYING A TRANSMISSION-TIME LIMIT FOR UPLINK MULTI-USER COMMUNICATION

CROSS-REFERENCE TO RELATED APPLICATION

This application claims the benefit of U.S. Provisional Application No. 62/814,183, entitled "Specifying a Transmission-Time Limit for Uplink Multi-User Communication," by Guoqing Li, et al., filed Mar. 5, 2019, the contents of which are hereby incorporated by reference.

FIELD

The described embodiments relate, generally, to communication of wireless signals by an electronic device, including techniques for communicating information that specifies a maximum transmission time for use during uplink multi-user communication.

BACKGROUND

Many electronic devices communicate with each other using wireless communication. For example, the communication between electronic devices may be based on a communication protocol that is compatible with an Institute of Electrical and Electronics Engineers (IEEE) standard, such as an IEEE 802.11 standard (which is sometimes referred to as 'Wi-Fi'). For example, IEEE 802.11ax has defined a feature called uplink multi-user in which an access point schedules multiple clients (which are sometimes referred to as 'stations' or 'recipient electronic devices') to transmit simultaneously in uplink, where different clients occupy different spatial or frequency resources (which are sometimes referred to as 'resource units' or RUs). One approach for uplink multi-user operation is uplink orthogonal frequency division multiple axis (OFDMA).

In uplink OFDMA, transmission parameters may be fully controlled by the access point, including the transmission modulation coding scheme (Tx MCS), the transmit power, and the transmit duration. For example, an access point may send a trigger frame to schedule transmissions by clients.

When a client has other radio activities, such as Bluetooth or long term evolution (LTE), it may need to control its own transmission parameters, such as the transmission duration. Consequently, in such a coexistence situation, the client may not be able to participate in uplink OFDMA operations.

In order to accommodate such a coexistence situation, IEEE 802.11ax has defined two bits in a media access control (MAC) header that can be used by a client to inform the access point of: uplink multi-user disable, in which all uplink OFDMA operations are disabled for this client (e.g., if this bit is set by the client, the access point cannot schedule the client in any uplink OFDMA transmission; and/or uplink multi-user data disable, in which only data transmission in uplink OFDMA is disabled for this client (e.g., the access point cannot schedule the client to transmit data packets in uplink OFDMA).

The uplink multi-user disable bit disables all uplink OFDMA operations. Therefore, a client cannot take advantage of any scheduled transmissions from the access point. Moreover, the uplink multi-user data disable bit disables data frame transmission in uplink OFDMA with the intent of having a short uplink OFDMA transmission time. However, the uplink multi-user data disable bit does not disable management frame transmission in uplink OFDMA. Consequently, the transmission time can still be quite long, which can interfere with other coexisting activities. Therefore, the existing two uplink OFDMA disable bits either forbid a client from using uplink OFDMA at all or cannot satisfy the coexistence requirements while still taking advantage of the uplink OFDMA feature.

Because of the uncertainty in the transmission duration, the Wi-Fi interference with another radio is also unknown. Consequently, a client may need to use timesharing between a Wi-Fi radio and the other radio(s). During timesharing, when another radio is in operation, the Wi-Fi radio is disabled, and vice versa. While timesharing avoids concurrent operation of the two radios in order to avoid mutual interference, timesharing is typically inefficient.

SUMMARY

In a first group of embodiments, an electronic device that selectively provides a trigger frame is described. This electronic device may include: a node (or a pad or a connector) that is communicatively coupled to an antenna; and an interface circuit, communicatively coupled to the node, that communicates with a recipient electronic device. During operation, the interface circuit may receive a frame associated with the recipient electronic device, where the frame includes information that specifies a maximum uplink multi-user transmit duration of the recipient electronic device. Moreover, the interface circuit may selectively provide the trigger frame intended for the recipient electronic device that specifies an uplink OFDMA frame or an uplink MIMO frame associated with the recipient electronic device. The trigger frame may be selectively provided when a transmit time corresponding to the uplink OFDMA frame or the uplink MIMO frame is less than or equal to the maximum uplink multi-user transmit duration.

Furthermore, in response to the trigger frame, the interface circuit may receive the uplink OFDMA frame or the uplink MIMO frame associated with the recipient electronic device.

Additionally, the frame may indicate that the maximum uplink multi-user transmit duration includes a notification that constrains scheduling of the recipient electronic device by the electronic device for uplink OFDMA communication or uplink MIMO communication.

In some embodiments, prior to the receiving frame, the interface circuit may provide a request intended for the recipient device for the maximum uplink multi-user transmit duration. For example, the frame may indicate that the maximum uplink multi-user transmit duration is negotiated between the electronic device and the recipient electronic device.

Note that the frame may indicate that the maximum uplink multi-user transmit duration includes a suggestion from the recipient electronic device for the electronic device.

Moreover, the frame may include a media access control (MAC) header that includes the information. For example, the information may be included in a control identifier or a command and status (CAS) control.

Furthermore, the frame may include a management frame with an action type associated with the maximum uplink multi-user transmit duration.

Other embodiments provide the integrated circuit for use with the electronic device.

Other embodiments provide a computer-readable storage medium for use with the electronic device. When program instructions stored in the computer-readable storage medium are executed by the electronic device, the program instructions may cause the electronic device to perform at least some of the aforementioned operations of the electronic device.

Other embodiments provide a method for selectively providing the trigger frame. The method includes at least some of the aforementioned operations performed by the electronic device.

Other embodiments provide a recipient electronic device. This recipient electronic device may include: a node (or a pad or a connector) that is communicatively coupled to an antenna; and an interface circuit, communicatively coupled to the node, that communicates with an electronic device. During operation, the interface circuit may provide a frame intended for the electronic device, where the frame includes information that specifies a maximum uplink multi-user transmit duration of the recipient electronic device.

Moreover, the interface circuit may selectively receive a trigger frame associated with the electronic device that specifies an uplink OFDMA frame or an uplink MIMO frame associated with the recipient electronic device. The trigger frame may be selectively received when a transmit time corresponding to the uplink OFDMA frame or the uplink MIMO frame is less than or equal to the maximum uplink multi-user transmit duration. Furthermore, in response to the trigger frame, the interface circuit may provide the uplink OFDMA frame or the uplink MIMO frame intended for the electronic device.

Additionally, the frame may indicate that the maximum uplink multi-user transmit duration includes a notification that constrains scheduling of the recipient electronic device for uplink OFDMA communication or uplink MIMO communication.

In some embodiments, prior to providing the frame, the interface circuit may receive a request associated with the electronic device for the maximum uplink multi-user transmit duration. For example, the frame may indicate that the maximum uplink multi-user transmit duration is negotiated between the electronic device and the recipient electronic device.

Note that the frame may indicate that the maximum uplink multi-user transmit duration includes a suggestion from the recipient electronic device for the electronic device.

Moreover, the frame may include a MAC header that includes the information. For example, the information may be included in a control identifier or a CAS control.

Furthermore, the frame may include a management frame with an action type associated with the maximum uplink multi-user transmit duration.

Other embodiments provide the integrated circuit for use with the recipient electronic device.

Other embodiments provide a computer-readable storage medium for use with the recipient electronic device. When program instructions stored in the computer-readable storage medium are executed by the recipient electronic device, the program instructions may cause the recipient electronic device to perform at least some of the aforementioned operations of the recipient electronic device.

Other embodiments provide a method for selectively receiving the trigger frame. The method includes at least some of the aforementioned operations performed by the recipient electronic device.

In a second group of embodiments, an electronic device that selectively provides a trigger frame is described. This electronic device may include: a node (or a pad or a connector) that is communicatively coupled to an antenna; and an interface circuit, communicatively coupled to the node, that communicates with a recipient electronic device. During operation, the interface circuit may selectively provide the trigger frame intended for the recipient electronic device that specifies an uplink OFDMA frame or an uplink MIMO frame associated with the recipient electronic device, where the trigger frame is selectively provided when a transmit time corresponding to the uplink OFDMA frame or the uplink MIMO frame is less than or equal to a maximum uplink multi-user transmit duration associated with a communication protocol.

Moreover, the interface circuit may schedule the recipient electronic device for uplink OFDMA communication or uplink MIMO communication when the transmit time corresponding to the uplink OFDMA communication or the uplink MIMO communication is less than or equal to the maximum uplink multi-user transmit duration associated with the communication protocol.

Other embodiments provide the integrated circuit for use with the electronic device.

Other embodiments provide a computer-readable storage medium for use with the electronic device. When program instructions stored in the computer-readable storage medium are executed by the electronic device, the program instructions may cause the electronic device to perform at least some of the aforementioned operations of the electronic device.

Other embodiments provide a method for selectively providing the trigger frame. The method includes at least some of the aforementioned operations performed by the electronic device.

Other embodiments provide a recipient electronic device. This recipient electronic device may include: a node (or a pad or a connector) that is communicatively coupled to an antenna; and an interface circuit, communicatively coupled to the node, that communicates with an electronic device. During operation, the interface circuit selectively receives a trigger frame associated with the electronic device that specifies an uplink OFDMA frame or an uplink MIMO frame associated with the recipient electronic device, where the trigger frame is selectively received when a transmit time corresponding to the uplink OFDMA frame or the uplink MIMO frame is less than or equal to a maximum uplink multi-user transmit duration associated with a communication protocol.

Moreover, the interface circuit may provide, in response to the trigger frame, the uplink OFDMA frame or the uplink MIMO frame intended for the electronic device.

Other embodiments provide the integrated circuit for use with the recipient electronic device.

Other embodiments provide a computer-readable storage medium for use with the recipient electronic device. When program instructions stored in the computer-readable storage medium are executed by the recipient electronic device, the program instructions may cause the recipient electronic device to perform at least some of the aforementioned operations of the recipient electronic device.

Other embodiments provide a method for selectively receiving the trigger frame. The method includes at least some of the aforementioned operations performed by the recipient electronic device.

In a third group of embodiments, an electronic device that selectively provides a second frame is described. This electronic device may include: a node (or a pad or a connector) that is communicatively coupled to an antenna; and an interface circuit, communicatively coupled to the node, that communicates with a recipient electronic device. During operation, the interface circuit may receive a frame associated with the recipient electronic device that includes information specifying enabling of uplink multi-user data disable. Moreover, the interface circuit may selectively provide a second frame intended for the recipient electronic device based at least in part on the enabled uplink multi-user data disable and a predefined maximum uplink multi-user transmit duration, where the second frame is selectively provided when a transmit time corresponding to the second frame or a response to the second frame is less than or equal to the predefined maximum uplink multi-user transmit duration.

Furthermore, the second frame may include a management frame or a trigger frame. The trigger frame may specify an uplink OFDMA frame or an uplink MIMO frame associated with the recipient electronic device.

Additionally, the predefined maximum uplink multi-user transmit duration may be associated with a communication protocol.

In some embodiments, the predefined maximum uplink multi-user transmit duration was previously provided to the electronic device and is associated with the recipient electronic device.

Other embodiments provide the integrated circuit for use with the electronic device.

Other embodiments provide a computer-readable storage medium for use with the electronic device. When program instructions stored in the computer-readable storage medium are executed by the electronic device, the program instructions may cause the electronic device to perform at least some of the aforementioned operations of the electronic device.

Other embodiments provide a method for selectively providing a second frame. The method includes at least some of the aforementioned operations performed by the electronic device.

Other embodiments provide a recipient electronic device. This recipient electronic device may include: a node (or a pad or a connector) that is communicatively coupled to an antenna; and an interface circuit, communicatively coupled to the node, that communicates with an electronic device. During operation, the interface circuit provides a frame intended for the electronic device that includes information specifying enabling of uplink multi-user data disable. Moreover, the interface circuit selectively receives a second frame associated with the electronic device based at least in part on the enabled uplink multi-user data disable and a predefined maximum uplink multi-user transmit duration, where the second frame is selectively received when a transmit time corresponding to the second frame or a response to the second frame by the recipient electronic device is less than or equal to the predefined maximum uplink multi-user transmit duration.

Furthermore, the second frame may include a management frame or a trigger frame. The trigger frame may specify an uplink OFDMA frame or an uplink MIMO frame intended for the electronic device.

Additionally, the predefined maximum uplink multi-user transmit duration may be associated with a communication protocol.

In some embodiments, the predefined maximum uplink multi-user transmit duration is associated with the recipient electronic device and was previously provided by the recipient electronic device.

Other embodiments provide the integrated circuit for use with the recipient electronic device.

Other embodiments provide a computer-readable storage medium for use with the recipient electronic device. When program instructions stored in the computer-readable storage medium are executed by the recipient electronic device, the program instructions may cause the recipient electronic device to perform at least some of the aforementioned operations of the recipient electronic device.

Other embodiments provide a method for selectively receiving a second frame. The method includes at least some of the aforementioned operations performed by the recipient electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIG. 11 is a drawing illustrating an example of fields in a frame communicated between the electronic devices of FIG. 1.

FIG. 12 is a drawing illustrating an example of fields in a frame communicated between the electronic devices of FIG. 1.

FIG. 13 is a drawing illustrating an example of fields in a management frame communicated between the electronic devices of FIG. 1.

FIG. 14 is a drawing illustrating an example of fields in a frame communicated between the electronic devices of FIG. 1.

Note that like reference numerals refer to corresponding parts throughout the drawings. Moreover, multiple instances of the same part are designated by a common prefix separated from an instance number by a dash.

DETAILED DESCRIPTION

Figure 1:
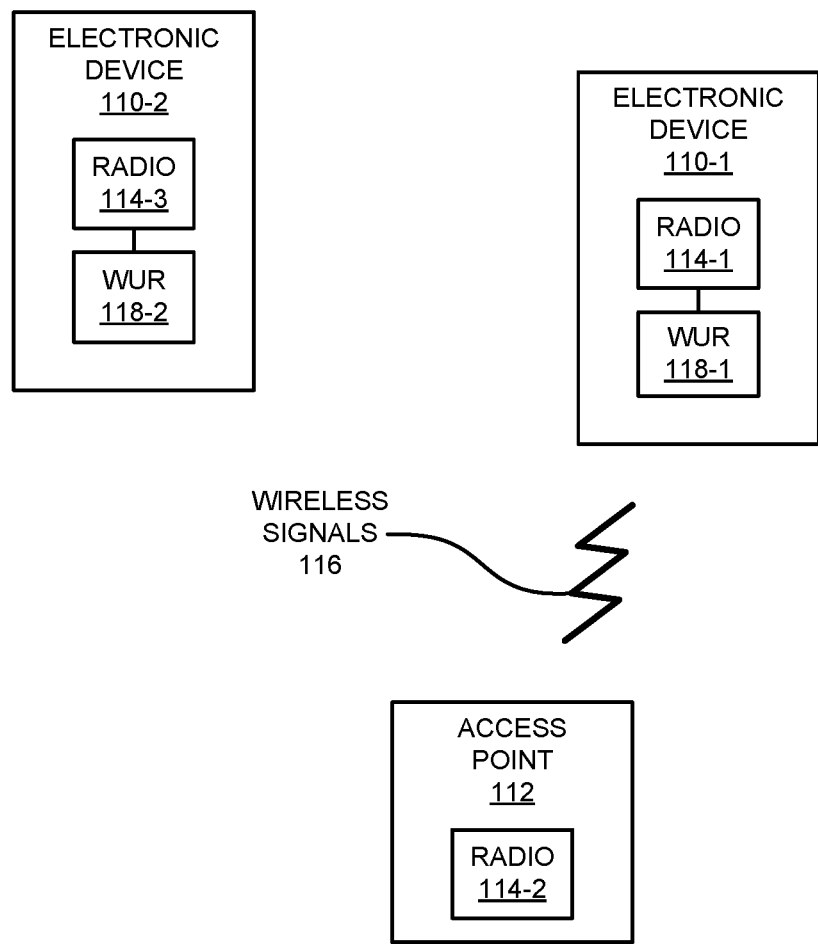
FIG. 1 is a block diagram illustrating an example of communication between electronic devices.

In a first group of embodiments, an electronic device that selectively provides a trigger frame is described. During operation, the electronic device may receive a frame from a recipient electronic device, where the frame includes information that specifies a maximum uplink multi-user transmit duration of the recipient electronic device. Moreover, the electronic device may selectively provide the trigger frame to the recipient electronic device that specifies an uplink OFDMA frame or an uplink MIMO frame associated with the recipient electronic device. The trigger frame may be selectively provided when a transmit time corresponding to the uplink OFDMA frame or the uplink MIMO frame is less than or equal to the maximum uplink multi-user transmit duration.

In a second group of embodiments, an electronic device that selectively provides a trigger frame is described. During operation, the electronic device may selectively provide the trigger frame to a recipient electronic device that specifies an uplink OFDMA frame or an uplink MIMO frame associated with the recipient electronic device, where the trigger frame is selectively provided when a transmit time corresponding to the uplink OFDMA frame or the uplink MIMO frame is less than or equal to a maximum uplink multi-user transmit duration associated with a communication protocol.

In a third group of embodiments, an electronic device that selectively provides a second frame is described. During operation, electronic device may receive a frame from a recipient electronic device that includes information specifying enabling of uplink multi-user data disable. Moreover, the electronic device may selectively provide a second frame to the recipient electronic device based at least in part on the enabled uplink multi-user data disable and a predefined maximum uplink multi-user transmit duration, where the second frame is selectively provided when a transmit time corresponding to the second frame or a response to the second frame is less than or equal to the predefined maximum uplink multi-user transmit duration.

By selectively providing the trigger frame or the second frame, the communication techniques may decrease or eliminate an uncertainty in a transmission duration. For example, the communication techniques may bound the transmit time corresponding uplink OFDMA frame or the uplink MIMO frame to being less than or equal to the maximum uplink multi-user transmit duration, with may reduce management frame overhead associated with uplink OFMDA or uplink MIMO. Moreover, the reduced uncertainty in the transmission duration may make interference associated with concurrent radio operation more predictable. Therefore, the communication techniques may facilitate and enable concurrent operation of a Wi-Fi radio and one or more other radio(s), which may make communication with the electronic device (such as an access point) and/or the recipient electronic device more efficient. Furthermore, the communication techniques may allow the recipient electronic device to suggest or control uplink OFMDA or uplink MIMO operations, so that uplink OFMDA or uplink MIMO communication can occur in a variety of ways other than all or nothing. These capabilities may facilitate improved communication performance of the electronic device and/or the recipient electronic device, which may improve the user experience and customer satisfaction.

Note that the communication techniques may be used during wireless communication between electronic devices in accordance with a communication protocol, such as a communication protocol that is compatible with an IEEE 802.11 standard (which is sometimes referred to as Wi-Fi). In some embodiments, the communication techniques are used with IEEE 802.11BA and/or IEEE 802.11ax, which are used as illustrative examples in the discussion that follows. However, this communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11-2016; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with or may have a connection with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

Figure 15:
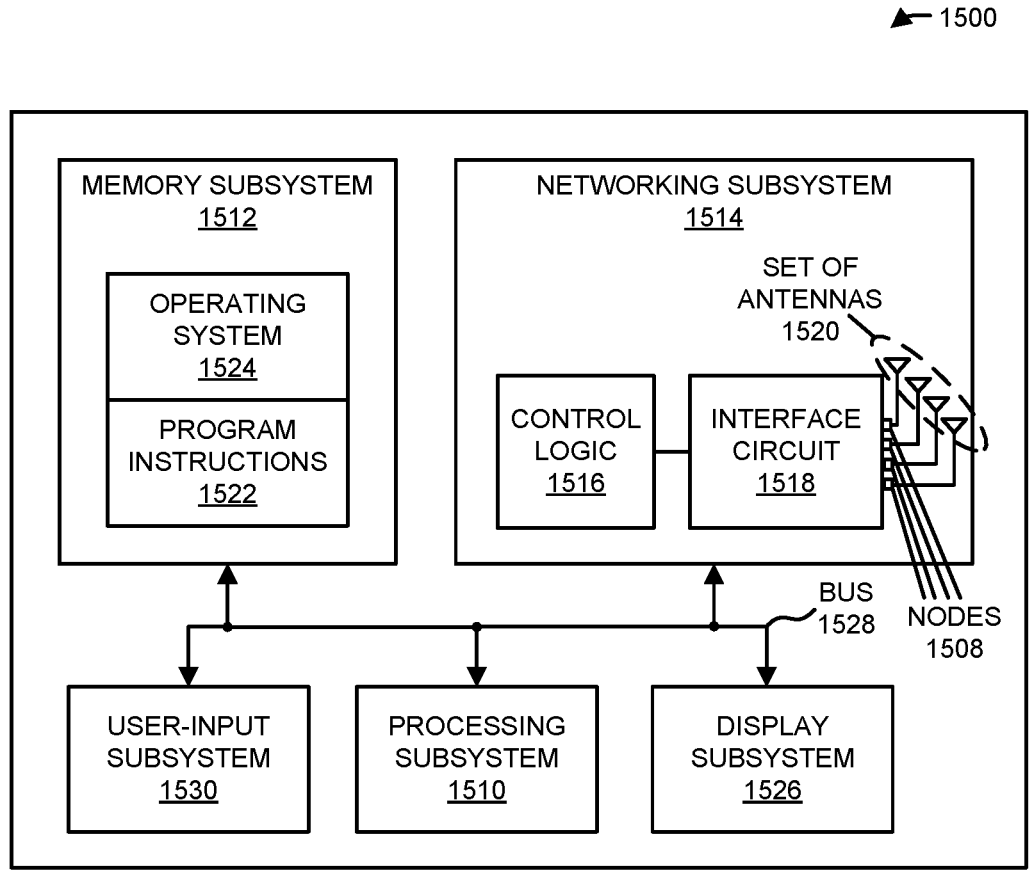
FIG. 15 is a block diagram illustrating an example of an electronic device of FIG. 1.

As described further below with reference to FIG. 15, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, as noted previously, electronic device 110-1 and access point 112 may exchange packets using a Wi-Fi communication protocol in a WLAN. As illustrated further below with reference to FIGS. 2-7, radio 114-1 may receive wireless signals 116 that are transmitted by radio 114-2. Alternatively, radio 114-1 may transmit wireless signals 116 that are received by radio 114-2.

Note that radio 114-1 may consume additional power in a higher-power mode. If radio 114-1 remains in the higher-power mode even when it is not transmitting or receiving packets, the power consumption of electronic device 110-1 may be needlessly increased. Consequently, electronic devices 110 may include wake-up radios (WURs) 118 that listen for and/or receive wake-up frames (and/or other wake-up communications), e.g., from access point 112. When a particular electronic device (such as electronic device 110-1) receives a wake-up frame, WUR 118-1 may selectively wake-up radio 114-1, e.g., by providing a wake-up signal that selectively transitions radio 114-1 from a lower-power mode to the higher-power mode.

As discussed previously, uncertainty in a transmission duration may restrict or constrain the use of an uplink OFDMA frame or an uplink MIMO frame, and may make communication with access point 112 more inefficient. For example, because the transmission duration may not be short or may be unpredictable, electronic device 110-1 may need to timeshare between a Wi-Fi radio and one or more other radio(s). The resulting adverse impact on the communication performance may degrade the user experience and customer satisfaction.

In order to address this challenge, as described below with reference to FIGS. 2-14, in some embodiments of the disclosed communication techniques a given electronic device (such as electronic device 110-1) may define, negotiate or recommend a maximum uplink multi-user transmit duration of electronic device 110-1. For example, electronic device 110-1 may provide a frame to access point 112 with information that specifies a maximum uplink multi-user transmit duration of electronic device 110-1. In embodiments where there is negotiation between electronic device 110-1 and access point 112, the frame may be provided to access point 112 in response to an optional request, which electronic device 110-1 received from access point 112, for the maximum uplink multi-user transmit duration of electronic device 110-1.

Then, when a transmit time corresponding to an uplink OFDMA frame or an uplink MIMO frame is less than or equal to the maximum uplink multi-user transmit duration, access point 112 may schedule electronic device 110-1 for uplink OFDMA communication or uplink MIMO communication. Moreover, access point 112 may selectively provide a trigger frame to electronic device 110-1 that specifies the uplink OFDMA frame or the uplink MIMO frame for electronic device 110-1. In response, electronic device 110-1 may selectively provide the uplink OFDMA frame or the uplink MIMO frame to access point 112.

In other embodiments, the maximum uplink multi-user transmit duration may be predefined. For example, the maximum uplink multi-user transmit duration may be specified by or associated with a communication protocol, such as IEEE 802.11ax. In these embodiments, the communication between electronic device 110-1 and access point 112 may be simplified. Notably, the optional request and the frame may not be needed. Instead, when a transmit time corresponding to an uplink OFDMA frame or an uplink MIMO frame is less than or equal to the maximum uplink multi-user transmit duration, access point 112 may schedule electronic device 110-1 for uplink OFDMA communication or uplink MIMO communication. Then, access point 112 may selectively provide a trigger frame to electronic device 110-1 that specifies the uplink OFDMA frame or the uplink MIMO frame for electronic device 110-1. In response, electronic device 110-1 may selectively provide the uplink OFDMA frame or the uplink MIMO frame to access point 112.

Alternatively, in some embodiments, an uplink multi-user data disable may be redefined to allow electronic device 110-1 to indicate that, when this bit is set by electronic device 110, then access point 112 cannot solicit electronic device 110-1 to transmit using uplink OFDMA or uplink MIMO when the transmission exceeds a certain duration value. Thus, by setting the uplink multi-user data disable, electronic device 110-1 may constrain all uplink OFDMA or uplink MIMO transmissions, including management frames, as opposed to only affecting uplink OFDMA or uplink MIMO data transmissions. This capability may ensure that uplink OFDMA or uplink MIMO transmissions from electronic device 110-1 are short, which may enable or allow concurrent communication using different radios.

In these embodiments, electronic device 110-1 may provide a frame to access point 112 that includes information specifying enabling of uplink multi-user data disable. In response, access point 112 may selectively provide a second frame (such as a trigger frame for an uplink OFDMA frame or an uplink MIMO frame) to electronic device 110-1 based at least in part on the enabled uplink multi-user data disable and a predefined maximum uplink multi-user transmit duration, where the second frame is selectively provided when a transmit time corresponding to the second frame or a response to the second frame is less than or equal to the predefined maximum uplink multi-user transmit duration. For example, the predefined maximum uplink multi-user transmit duration may be specified by a communication protocol, such as IEEE 802.11ax. Alternatively, the predefined maximum uplink multi-user transmit duration may be associated with electronic device 110-1 and may have been previously provided to access point 112 by electronic device 110-1. In response to the second frame, electronic device 110-1 may provide the uplink OFDMA frame or the uplink MIMO frame to access point 112.

In summary, the communication techniques may allow electronic device 110-1 to specify, negotiate or recommend a maximum uplink multi-user transmit duration. This capability may decrease or eliminate an uncertainty in a transmission duration associated with uplink OFMDA or uplink MIMO and/or may reduce management frame overhead associated with uplink OFMDA or uplink MIMO. Alternatively or additionally, the communication techniques may allow electronic device 110-1 to use an uplink multi-user data disable bit to selectively control the use of uplink OFMDA or uplink MIMO (including management frames), e.g., when a transmit duration is less than or equal to a maximum uplink multi-user transmit duration. By reducing or eliminating uncertainty in a transmission duration, the communication techniques may improve communication efficiency, may reduce interference and/or may enable concurrent communication using different radios (which may use different communication protocols).

Note that access point 112 and one or more electronic devices (such as electronic devices 110-1 and/or 110-2) may be compatible with an IEEE 802.11 standard that includes trigger-based channel access (such as IEEE 802.11ax). However, access point 112 and the one or more electronic devices may also communicate with one or more legacy electronic devices that are not compatible with the IEEE 802.11 standard (i.e., that do not use multi-user trigger-based channel access). In some embodiments, access point 112 and the one or more electronic devices use multi-user transmission (such as OFDMA). For example, radio 114-2 may provide a trigger frame for the one or more electronic devices. Moreover, in response to receiving the trigger frame, radio 114-1 may provide a group acknowledgment to radio 114-2. For example, radio 114-1 may provide the acknowledgment during an assigned time slot and/or in an assigned channel in the group acknowledgment. However, in some embodiments one or more of electronic devices 110 may individually provide acknowledgments to radio 114-2. Thus, radio 114-1 (and, more generally, radios 114 in the electronic devices 110-1 and/or 110-2) may provide an acknowledgment to radio 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication techniques may be characterized by a variety of communication-performance metrics. For example, the communication-performance metric may include any/all of: a received signal strength indicator (RSSI), a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
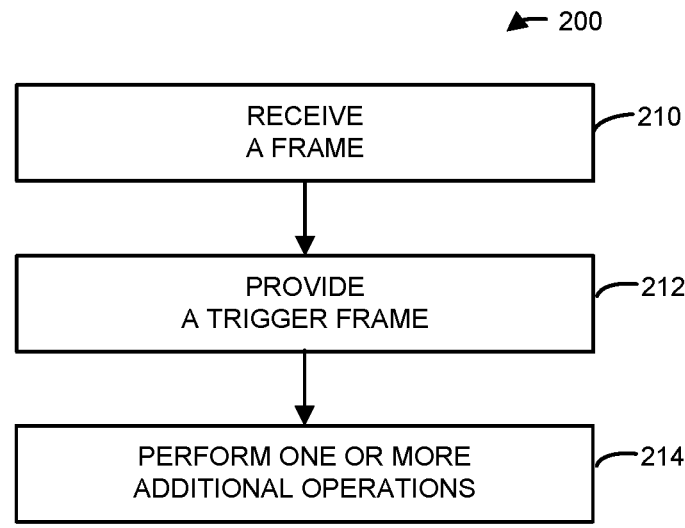
FIG. 2 is a flow diagram illustrating an example method for selectively providing a trigger frame using an electronic device of FIG. 1.

FIG. 2 presents a flow diagram illustrating an example method 200 for selectively providing a trigger frame. This method may be performed by an electronic device, such as access point 112 in FIG. 1. Note that the communication with the recipient electronic device may be compatible with an IEEE 802.11 communication protocol.

During operation, the electronic device may receive a frame (operation 210) associated with a recipient electronic device, where the frame includes information that specifies a maximum uplink multi-user transmit duration of the recipient electronic device.

Moreover, the electronic device may selectively provide the trigger frame (operation 212) intended for (or addressed to) the recipient electronic device that specifies an uplink OFDMA frame or an uplink MIMO frame associated with the recipient electronic device. The trigger frame may be selectively provided when a transmit time corresponding to the uplink OFDMA frame or the uplink MIMO frame is less than or equal to the maximum uplink multi-user transmit duration.

In some embodiments, the electronic device performs one or more optional additional operations (operation 214). For example, in response to the trigger frame, the electronic device may receive the uplink OFDMA frame or the uplink MIMO frame associated with the recipient electronic device.

Moreover, prior to the receiving frame (operation 210), the electronic device may provide a request intended for the recipient device for the maximum uplink multi-user transmit duration. For example, the frame may indicate that the maximum uplink multi-user transmit duration is negotiated between the electronic device and the recipient electronic device.

Furthermore, the frame may indicate that the maximum uplink multi-user transmit duration includes a notification that constrains scheduling of the recipient electronic device by the electronic device for uplink OFDMA communication or uplink MIMO communication.

Note that the frame may indicate that the maximum uplink multi-user transmit duration includes a suggestion from the recipient electronic device for the electronic device. Moreover, the frame may include a MAC header that includes the information. For example, the information may be included in a control identifier or a CAS control. Furthermore, the frame may include a management frame with an action type associated with the maximum uplink multi-user transmit duration.

Figure 3:
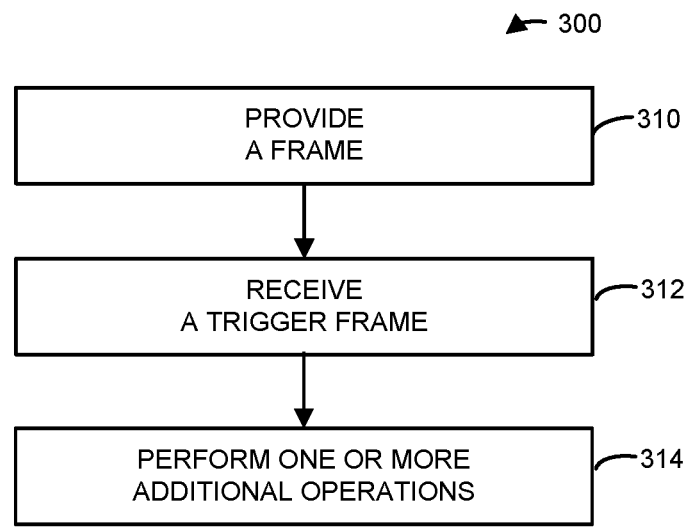
FIG. 3 is a flow diagram illustrating an example method for selectively receiving a trigger frame using an electronic device of FIG. 1.

FIG. 3 presents a flow diagram illustrating an example method 300 for selectively receiving a trigger frame. This method may be performed by a recipient electronic device, such as electronic device 110-1 in FIG. 1. Note that the communication with the recipient electronic device may be compatible with an IEEE 802.11 communication protocol.

During operation, the recipient electronic device may provide a frame (operation 310 intended for (or addressed to) an electronic device, where the frame includes information that specifies a maximum uplink multi-user transmit duration of the recipient electronic device.

Moreover, the recipient electronic device may selectively receive the trigger frame (operation 312) associated with the electronic device that specifies an uplink OFDMA frame or an uplink MIMO frame associated with the recipient electronic device. The trigger frame may be selectively received when a transmit time corresponding to the uplink OFDMA frame or the uplink MIMO frame is less than or equal to the maximum uplink multi-user transmit duration.

In some embodiments, the recipient electronic device performs one or more optional additional operations (operation 314). For example, in response to the trigger frame, the recipient electronic device may provide the uplink OFDMA frame or the uplink MIMO frame intended for the electronic device.

Moreover, prior to providing the frame (operation 310), the recipient electronic device may receive a request associated with the electronic device for the maximum uplink multi-user transmit duration. For example, the frame may indicate that the maximum uplink multi-user transmit duration is negotiated between the electronic device and the recipient electronic device.

Furthermore, the frame may indicate that the maximum uplink multi-user transmit duration includes a notification that constrains scheduling of the recipient electronic device for uplink OFDMA communication or uplink MIMO communication.

Note that the frame may indicate that the maximum uplink multi-user transmit duration includes a suggestion from the recipient electronic device for the electronic device. Moreover, the frame may include a MAC header that includes the information. For example, the information may be included in a control identifier or a CAS control. Furthermore, the frame may include a management frame with an action type associated with the maximum uplink multi-user transmit duration.

Figure 4:
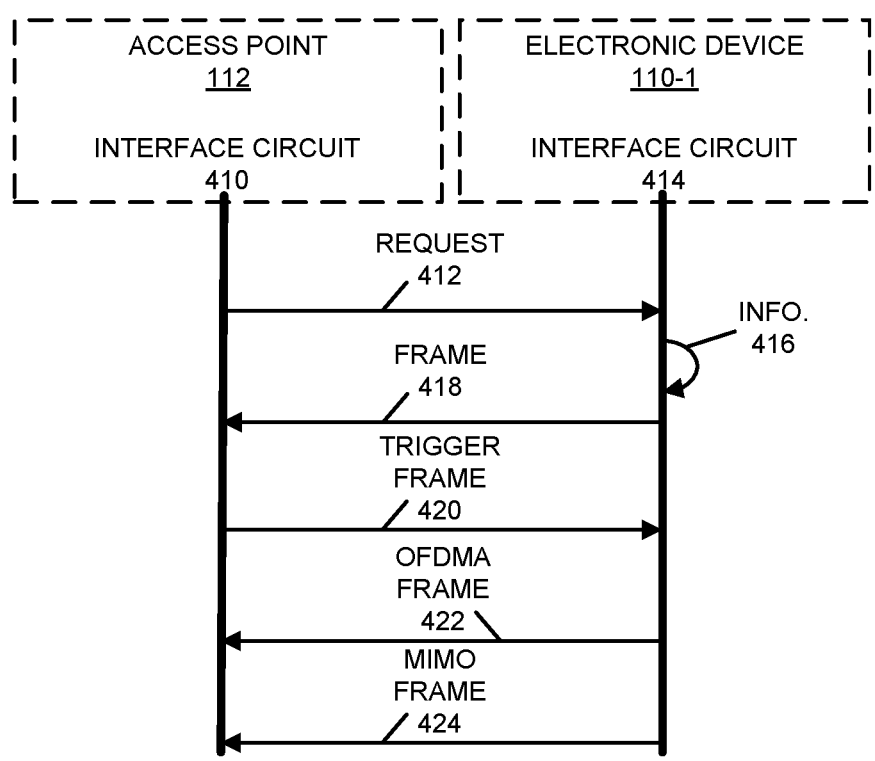
FIG. 4 is a flow diagram illustrating an example of communication among components in the electronic devices of FIG. 1.

The communication techniques are further illustrated in FIG. 4, which presents a flow diagram illustrating an example of communication among components in electronic devices 110-1 and access point 112. During operation, an integrated circuit 410 in access point 112 may optionally provide a request 412 to electronic device 110-1 for a maximum uplink multi-user transmit duration of electronic device 110-1. Then, optionally after receiving request 412 from access point 112, an integrated circuit 414 in electronic device 110-1 may provide a frame 418 to access point 112, where the frame includes information 416 that specifies the maximum uplink multi-user transmit duration of electronic device 110-1.

After receiving frame 418 from electronic device 110-1, integrated circuit 410 may selectively provide a trigger frame 420 to electronic device 110-1 that specifies an uplink OFDMA frame 422 or an uplink MIMO frame 424 associated with electronic device 110-1. Note that trigger frame 420 may be selectively provided when a transmit time corresponding to uplink OFDMA frame 422 or uplink MIMO frame 424 is less than or equal to the maximum uplink multi-user transmit duration.

Moreover, after receiving trigger frame 420 from access point 112, integrated circuit 414 may provide uplink OFDMA frame 422 or uplink MIMO frame 424 to access point 112. Next, integrated circuit 410 may receive uplink OFDMA frame 422 or uplink MIMO frame 424 from electronic device 110-1.

Figure 5:
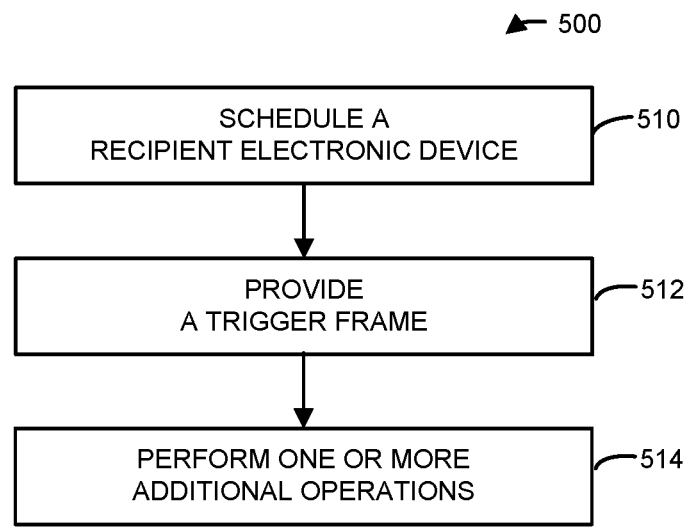
FIG. 5 is a flow diagram illustrating an example method for selectively providing a trigger frame using an electronic device of FIG. 1.

FIG. 5 presents a flow diagram illustrating an example method 500 for selectively providing a trigger frame. This method may be performed by an electronic device, such as access point 112 in FIG. 1. Note that the communication with the recipient electronic device may be compatible with an IEEE 802.11 communication protocol.

During operation, the electronic device may schedule a recipient electronic device (operation 510) for uplink OFDMA communication or uplink MIMO communication when the transmit time corresponding to the uplink OFDMA communication or the uplink MIMO communication is less than or equal to the maximum uplink multi-user transmit duration associated with the communication protocol.

Moreover, the electronic device may selectively provide the trigger frame (operation 512) intended for (or addressed to) the recipient electronic device that specifies an uplink OFDMA frame or an uplink MIMO frame associated with the recipient electronic device, where the trigger frame is selectively provided when a transmit time corresponding to the uplink OFDMA frame or the uplink MIMO frame is less than or equal to the maximum uplink multi-user transmit duration associated with the communication protocol.

In some embodiments, the electronic device performs one or more optional additional operations (operation 514). For example, in response to the trigger frame, the electronic device may receive the uplink OFDMA frame or the uplink MIMO frame associated with the recipient electronic device.

Figure 6:
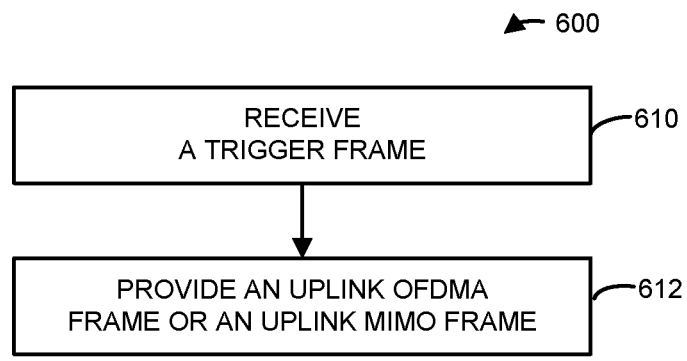
FIG. 6 is a flow diagram illustrating an example method for selectively receiving a trigger frame using an electronic device of FIG. 1.

FIG. 6 presents a flow diagram illustrating an example method 600 for selectively receiving a trigger frame. This method may be performed by a recipient electronic device, such as electronic device 110-1 in FIG. 1. Note that the communication with the recipient electronic device may be compatible with an IEEE 802.11 communication protocol.

During operation, the recipient electronic device may selectively receive the trigger frame (operation 610) associated with an electronic device that specifies an uplink OFDMA frame or an uplink MIMO frame associated with the recipient electronic device, where the trigger frame is selectively received when a transmit time corresponding to the uplink OFDMA frame or the uplink MIMO frame is less than or equal to a maximum uplink multi-user transmit duration associated with a communication protocol. Moreover, the recipient electronic device may provide, in response to the trigger frame, the uplink OFDMA frame or the uplink MIMO frame (operation 612) intended for (or addressed to) the electronic device.

Figure 7:
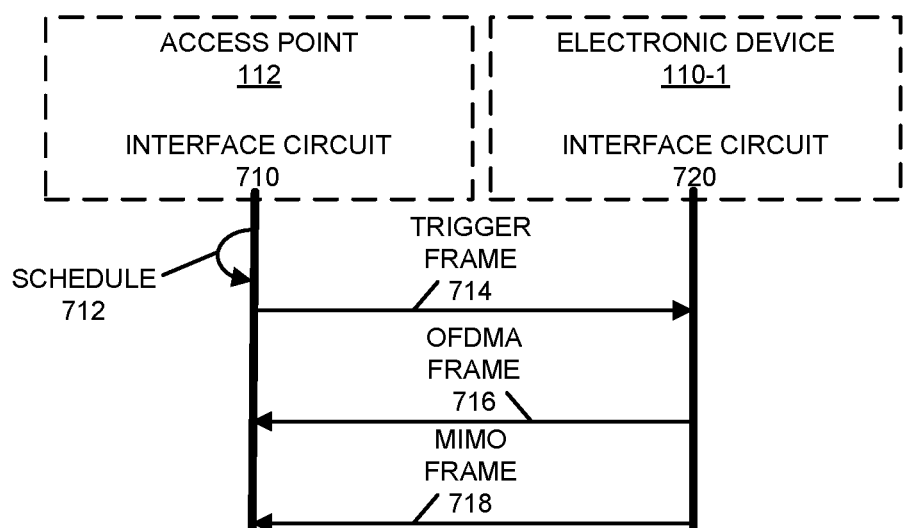
FIG. 7 is a flow diagram illustrating an example of communication among components in the electronic devices of FIG. 1.

The communication techniques are further illustrated in FIG. 7, which presents a flow diagram illustrating an example of communication among components in electronic devices 110-1 and access point 112. During operation, an integrated circuit 710 in access point 112 may schedule 712 electronic device 110-1 for uplink OFDMA communication or uplink MIMO communication when a transmit time corresponding to the uplink OFDMA communication or the uplink MIMO communication is less than or equal to a maximum uplink multi-user transmit duration associated with a communication protocol (such as Wi-Fi).

Moreover, integrated circuit 710 may selectively provide a trigger frame 714 to electronic device 110-1 that specifies an uplink OFDMA frame 714 or an uplink MIMO frame 716 associated with electronic device 110-1, where trigger frame 714 is selectively provided when a transmit time corresponding to uplink OFDMA frame 716 or uplink MIMO frame 718 is less than or equal to the maximum uplink multi-user transmit duration associated with the communication protocol.

Then, an interface circuit 720 in electronic device 110-1 may selectively receive trigger frame 714 from access point 112. In response, interface circuit 720 may provide uplink OFDMA frame 716 or uplink MIMO frame 718 to access point 112. Next, interface circuit 710 may receive uplink OFDMA frame 716 or uplink MIMO frame 718 from electronic device 110-1.

Figure 8:
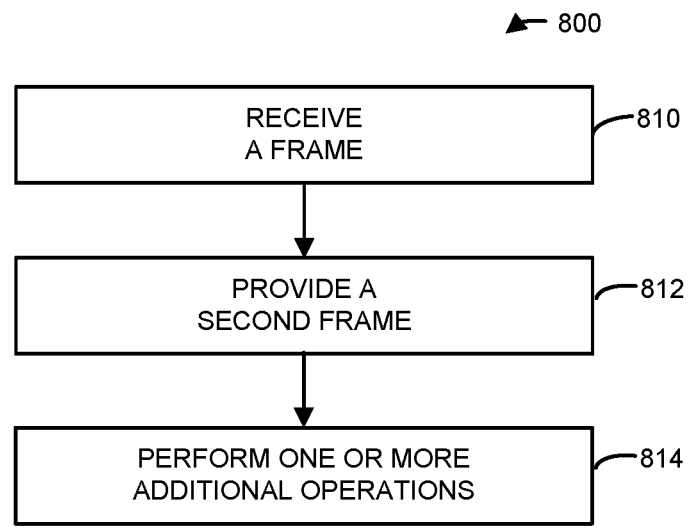
FIG. 8 is a flow diagram illustrating an example method for selectively providing a second frame using an electronic device of FIG. 1.

FIG. 8 presents a flow diagram illustrating an example method 800 for selectively providing a second frame. This method may be performed by an electronic device, such as access point 112 in FIG. 1. Note that the communication with the recipient electronic device may be compatible with an IEEE 802.11 communication protocol.

During operation, the electronic device may receive a frame (operation 810) associated with a recipient electronic device that includes information specifying enabling of uplink multi-user data disable. Moreover, the electronic device may selectively provide the second frame (operation 812) intended for the recipient electronic device based at least in part on the enabled uplink multi-user data disable and a predefined maximum uplink multi-user transmit duration, where the second frame is selectively provided when a transmit time corresponding to the second frame or a response to the second frame is less than or equal to the predefined maximum uplink multi-user transmit duration.

Note that the second frame may include a management frame or a trigger frame. The trigger frame may specify an uplink OFDMA frame or an uplink MIMO frame associated with the recipient electronic device. Moreover, the predefined maximum uplink multi-user transmit duration may be associated with a communication protocol. Furthermore, the predefined maximum uplink multi-user transmit duration may have been previously provided to the electronic device and may be associated with the recipient electronic device.

In some embodiments, the electronic device performs one or more optional additional operations (operation 914). For example, in response to the second frame, the electronic device may receive an uplink OFDMA frame or an uplink MIMO frame associated with the recipient electronic device.

Figure 9:
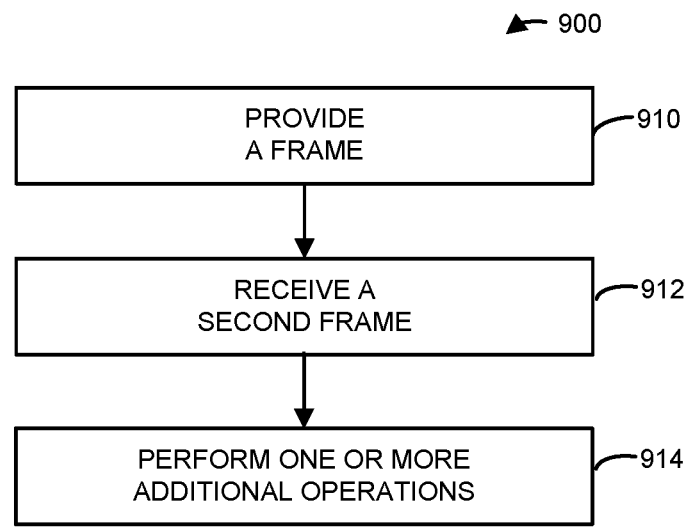
FIG. 9 is a flow diagram illustrating an example method for selectively receiving a second frame using an electronic device of FIG. 1.

FIG. 9 presents a flow diagram illustrating an example method 900 for selectively receiving a second frame. This method may be performed by a recipient electronic device, such as electronic device 110-1 in FIG. 1. Note that the communication with the recipient electronic device may be compatible with an IEEE 802.11 communication protocol.

During operation, the recipient electronic device may provide a frame (operation 910) intended for an electronic device that includes information specifying enabling of uplink multi-user data disable. Moreover, the recipient electronic device may selectively receive the second frame (operation 912) associated with the electronic device based at least in part on the enabled uplink multi-user data disable and a predefined maximum uplink multi-user transmit duration, where the second frame is selectively received when a transmit time corresponding to the second frame or a response to the second frame by the recipient electronic device is less than or equal to the predefined maximum uplink multi-user transmit duration.

In some embodiments, the electronic device performs one or more optional additional operations (operation 914). For example, in response to the second frame, the recipient electronic device may provide an uplink OFDMA frame or an uplink MIMO frame intended for the electronic device.

Note that the second frame may include a management frame or a trigger frame. The trigger frame may specify an uplink OFDMA frame or an uplink MIMO frame intended for the electronic device. Moreover, the predefined maximum uplink multi-user transmit duration may be associated with a communication protocol. Furthermore, the predefined maximum uplink multi-user transmit duration may be associated with the recipient electronic device and may have been previously provided by the recipient electronic device.

In some embodiments of method 200 (FIG. 2), 300 (FIG. 3), 500 (FIG. 5), 600 (FIG. 6), 800 (FIG. 8) and/or 900 (FIG. 10) there may be additional or fewer operations. Further, one or more different operations may be included. Moreover, the order of the operations may be changed, and/or two or more operations may be combined into a single operation or performed at least partially in parallel.

Figure 10:
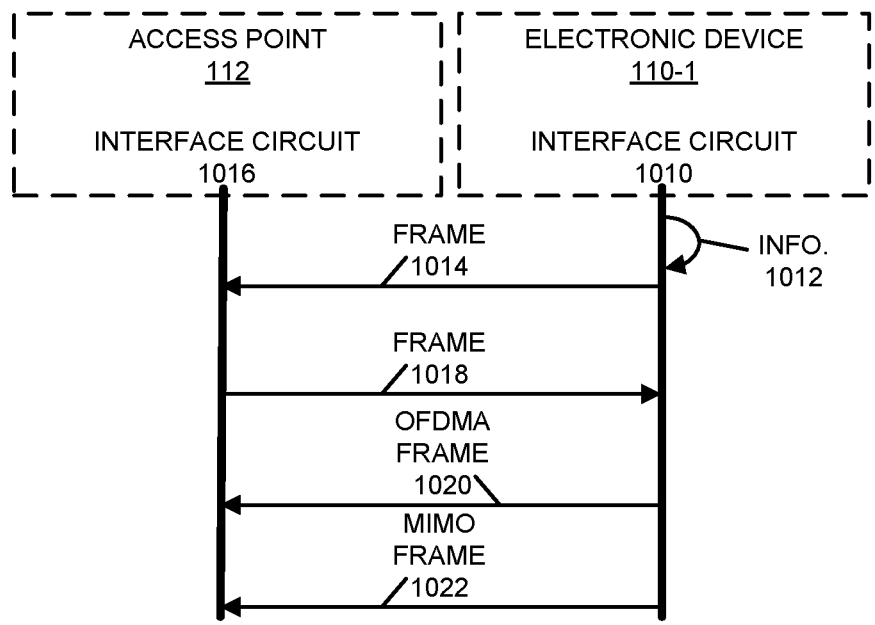
FIG. 10 is a flow diagram illustrating an example of communication among components in the electronic devices of FIG. 1.

The communication techniques are further illustrated in FIG. 10, which presents a flow diagram illustrating an example of communication among components in electronic devices 110-1 and access point 112. During operation, an integrated circuit 1010 in electronic device 110-1 may provide a frame 1014 to access point 112 that includes information 1012 specifying enabling of uplink multi-user data disable.

Then, an integrated circuit 1016 in access point 112 may receive frame 1014 from electronic device 110-1. Moreover, integrated circuit 1016 may selectively provide frame 1018 to electronic device 110-1 based at least in part on the enabled uplink multi-user data disable and a predefined maximum uplink multi-user transmit duration, where frame 1018 is selectively provided when a transmit time corresponding to frame 1018 or a response to frame 1018 is less than or equal to the predefined maximum uplink multi-user transmit duration.

Furthermore, integrated circuit 1010 may selectively receive frame 1018 from access point 112 based at least in part on the enabled uplink multi-user data disable and the predefined maximum uplink multi-user transmit duration. Then, integrated circuit 1010 may provide an uplink OFDMA frame 1020 or an uplink MIMO frame 1022 to access point 112. Additionally, integrated circuit 1016 may receive uplink OFDMA frame 1020 or uplink MIMO frame 1022 from electronic device 110-1.

While communication between the components in FIGS. 4, 7 and/or 10 are illustrated with unilateral or bilateral communication (e.g., lines having a single arrow or dual arrows), in general a given communication operation may be unilateral or bilateral.

In the discussion that follows, uplink OFDMA is used as an illustrative example. However, the disclosed communication techniques also apply to other uplink multi-user techniques, such as uplink multi-user MIMO.

In some embodiments of the communication techniques, a client may inform an access point of a maximum allowed transmit duration in uplink OFDMA. This information may be communicated from the client to the access point in a variety of ways, including: demand-based, in which a client notifies an access point of the maximum uplink OFDMA transmit duration and the access point has to accept it; request and response, in which a client and an access point can negotiate the final value used as the maximum uplink OFDMA transmit duration; or a suggestion from a client to an access point. Note that the negotiation signaling can be performed using a MAC header or one or more management frames.

In some embodiments of the communication techniques, the uplink multi-user data disable bit may be redefined in the IEEE 802.11ax specification to mean that, when the uplink multi-user data disable bit is set by a client, then an access point cannot schedule the client in uplink OFDMA with a transmit duration more than a predefined value. This predefined value may be a fixed value specified in, e.g., the IEEE 802.11ax specification (e.g., 2 ms) or a value announced or specified by a client, an access point, or negotiated between the client and the access point.

The maximum uplink OFDMA transmit duration may be specified by a field, such as a 'maximum uplink OFDMA transmit duration field.' This field may be used to inform the access point of the maximum transmit duration that the access point assigns to this client or user in uplink OFDMA transmissions. Note that the maximum uplink OFDMA transmit duration field may have a unit duration and a maximum duration. For example, when this field is 1 byte long and the unit duration is 32 µs, then the maximum duration is 256×32 or 8.192 ms.

Moreover, the maximum uplink OFDMA transmit duration may be used to notify the access point of the maximum transmit duration the client can participate or have in uplink OFDMA. The access point may have to use this value as is and cannot violate or change the information the client notified or provided to the access point. Alternatively, the maximum uplink OFDMA transmit duration can be used between the access point and the client to negotiate the actual value used by the access point in the uplink OFDM allocation for the client. In some embodiments, the maximum uplink OFDMA transmit duration can be used by the client to suggest a value to the access point, e.g., this is the requested maximum uplink OFDMA transmit duration that the access point should use for this client. In these embodiments, this value may serve as a recommendation from the client to the access point.

When the value of the maximum uplink OFDMA transmit duration is carried or conveyed in a MAC header, it may be included in a new control identifier (such as control identifier 7) or in a modified CAS control (e.g., in the 8 bits of the control identifier 6) in the A-Control Field.

Furthermore, in order to modify the CAS control, the value of the maximum uplink OFDMA transmit duration may be included in the control information subfield of the CAS control. This is shown in FIG. 11, which presents a drawing illustrating an example of fields in a frame communicated between the electronic devices of FIG. 1. Notably, the control information subfield 1100 for a CAS control may include: an AC constraint 1110 (such as 1 bit), a RDG/More PPDU 1112 (such as 1 bit), an SR PPDU 1114 (such as 1 bit), reserved bits 1116 (such as 5 bits) and a maximum uplink OFDMA transmission duration 1116.

Alternatively, a new control identifier may include a request type (such as notification, negotiation, recommendation) and the value of the maximum uplink OFDMA transmit duration may be included in the payload field. This is shown in FIG. 12, which presents a drawing illustrating an example of fields in a frame communicated between the electronic devices of FIG. 1. Notably, control identifier 1200 may include: a request type 1210, and a maximum uplink OFDMA transmit duration 1212.

Additionally, in some embodiments of the communication techniques, a new management action frame can be defined to allow a client to notify or negotiate with an access point. For example, a new action type called 'uplink multi-user duration' may be used as a new type of management frame. This is shown in FIG. 13, which presents a drawing illustrating an example of fields in a management frame 1300 communicated between the electronic devices of FIG. 1. Notably, management frame 1300 may include: an action type 1310, a request type 1312 (e.g., notify, request, suggest or response); and parameter information 1314 (such as a value of a maximum uplink OFDMA transmit duration).

Moreover, in some embodiments of the communication techniques, the uplink multi-user data disable feature may be redefined. FIG. 14 presents a drawing illustrating an example of fields in a frame communicated between the electronic devices of FIG. 1. Notably, the control information subfield for operating mode (OM) control field 1400 (which is in MAC header) may include: a receiver NSS 1410 (such as 3 bits), a channel width 1412 (such as 2 bits), an uplink multi-user disable 1414 (such as 1 bit), a transmit NSTS 1416 (such as 3 bits), an ER single-user disable 1418 (such as 1 bit), a downlink multi-user MIMO resound recommendation 1420 (such as 1 bit), and an uplink multi-user data disable 1422 (such as 1 bit). In the existing IEEE 802.11ax standard, the uplink multi-user data disable 1422 bit in the OM control field 1400 allows a client to notify an access point to not solicit the client to send data frames using uplink OFDMA. This uplink multi-user data disable bit may allow the client to have very short transmissions using uplink OFDMA in order to avoid conflict with other radio activities. However, the uplink multi-user data disable 1422 bit does not forbid the access point from soliciting the client to send management frames, which can still be quite long. Consequently, an uplink OFDMA transmission from the client can still be quite long.

In some embodiments of the communication techniques, the uplink multi-user data disable 1422 bit may be redefined to mean that, when this bit is set by a client, then an access point cannot solicit the client to transmit using uplink OFDMA when the transmission exceeds a certain duration value. (Thus, the uplink multi-user data disable 1422 bit may be redefined to constrain all uplink OFDMA transmissions, including management frames, as opposed to only affecting uplink OFDMA data transmissions.) This duration value can be a fixed predefined value in, e.g., the IEEE 802.11 ax specification (e.g., 2 ms). Alternatively, the duration value can be set up between the client and the access point using the following signaling options. Notably, an access point can advertise a duration value, e.g., a minimum duration value or a maximum duration value that it can accommodate. Alternatively, a client can send a frame to notify the access point of this duration value prior to using the uplink multi-user data disable 1422 bit. In some embodiments, a client can send a request to an access point to use a certain duration value. The access point can respond with acceptance or rejection of a duration value, or can suggest a different duration value for the client to use.

In summary, the embodiments of the communication techniques may allow a client to notify, suggest or negotiate with an access point about its maximum uplink OFDMA transmit duration. The access point can use this capability to accordingly schedule an uplink OFDMA transmission for the client. Note that the signaling used to convey the maximum uplink OFDMA transmit duration may be included in a MAC header or by using a new management frame. In some embodiments of the communication techniques, the uplink multi-user data disable bit may be redefined to allow a client to notify an access point of its maximum uplink OFDMA transmit duration based on a predefined value.

Note that the formats of packets or frames communicated during the communication techniques may include more or fewer bits or fields. Alternatively or additionally, the position of information in these packets or frames may be changed. Thus, the order of the fields may be changed.

While the preceding embodiments illustrate embodiments of the communication techniques using frequency sub-bands, in other embodiments the communication techniques may involve the concurrent use of different temporal slots, and/or or a combination of different frequency sub-bands, different frequency bands and/or different temporal slots.

As described herein, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 15 presents a block diagram of an electronic device 1500 (which may be a cellular telephone, a smartwatch, an access point, a wireless speaker, an IoT device, another electronic device, etc.) in accordance with some embodiments. This electronic device includes processing subsystem 1510, memory subsystem 1512 and networking subsystem

1514. Processing subsystem 1510 includes one or more devices configured to perform computational operations. For example, processing subsystem 1510 can include one or more microprocessors, application-specific integrated circuits (ASICs), microcontrollers, graphics processing units (GPUs), programmable-logic devices, and/or one or more digital signal processors (DSPs).

Memory subsystem 1512 includes one or more devices for storing data and/or instructions for processing subsystem 1510, and/or networking subsystem 1514. For example, memory subsystem 1512 can include dynamic random access memory (DRAM), static random access memory (SRAM), a read-only memory (ROM), flash memory, and/or other types of memory. In some embodiments, instructions for processing subsystem 1510 in memory subsystem 1512 include: program instructions or sets of instructions (such as program instructions 1522 or operating system 1524), which may be executed by processing subsystem 1510. For example, a ROM can store programs, utilities or processes to be executed in a non-volatile manner, and DRAM can provide volatile data storage, and may store instructions related to the operation of electronic device 1500. Note that the one or more computer programs may constitute a computer-program mechanism, a computer-readable storage medium or software. Moreover, instructions in the various modules in memory subsystem 1512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1510. In some embodiments, the one or more computer programs are distributed over a network-coupled computer system so that the one or more computer programs are stored and executed in a distributed manner.

In addition, memory subsystem 1512 can include mechanisms for controlling access to the memory. In some embodiments, memory subsystem 1512 includes a memory hierarchy that comprises one or more caches coupled to a memory in electronic device 1500. In some of these embodiments, one or more of the caches is located in processing subsystem 1510.

In some embodiments, memory subsystem 1512 is coupled to one or more high-capacity mass-storage devices (not shown). For example, memory subsystem 1512 can be coupled to a magnetic or optical drive, a solid-state drive, or another type of mass-storage device. In these embodiments, memory subsystem 1512 can be used by electronic device 1500 as fast-access storage for often-used data, while the mass-storage device is used to store less frequently used data.

Networking subsystem 1514 includes one or more devices configured to couple to and communicate on a wired and/or wireless network (i.e., to perform network operations), such as: control logic 1516, an interface circuit 1518 and a set of antennas 1520 (or antenna elements) in an adaptive array that can be selectively turned on and/or off by control logic 1516 to create a variety of optional antenna patterns or 'beam patterns.' Alternatively, instead of the set of antennas, in some embodiments electronic device 1500 includes one or more nodes 1508, e.g., a pad or a connector, which can be coupled to the set of antennas 1520. Thus, electronic device 1500 may or may not include the set of antenna 1520s. For example, networking subsystem 1514 can include a Bluetooth™ networking system, a cellular networking system (e.g., a 3G/4G/5G network such as UMTS, LTE, etc.), a universal serial bus (USB) networking system, a networking system based on the standards described in IEEE 802.12 (e.g., a Wi-Fi® networking system), an Ethernet networking system, and/or another networking system.

In some embodiments, networking subsystem 1514 includes one or more radios, such as a wake-up radio that is used to receive wake-up frames and wake-up beacons, and a main radio that is used to transmit and/or receive frames or packets during a normal operation mode. The wake-up radio and the main radio may be implemented separately (such as using discrete components or separate integrated circuits) or in a common integrated circuit.

Networking subsystem 1514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1500 may use the mechanisms in networking subsystem 1514 for performing simple wireless communication between the electronic devices, e.g., transmitting advertising or frame frames and/or scanning for advertising frames transmitted by other electronic devices.

Within electronic device 1500, processing subsystem 1510, memory subsystem 1512 and networking subsystem 1514 are coupled together using bus 1528 that facilitates data transfer between these components. Bus 1528 may include an electrical, optical, and/or electro-optical connection that the subsystems can use to communicate commands and data among one another. Although only one bus 1528 is shown for clarity, different embodiments can include a different number or configuration of electrical, optical, and/or electro-optical connections among the sub systems.

In some embodiments, electronic device 1500 includes a display subsystem 1526 for displaying information on a display, which may include a display driver and the display, such as a liquid-crystal display, a multi-touch touchscreen, etc. Display subsystem 1526 may be controlled by processing subsystem 1510 to display information to a user (e.g., information relating to incoming, outgoing, or an active communication session).

Electronic device 1500 can also include a user-input subsystem 1530 that allows a user of the electronic device 1500 to interact with electronic device 1500. For example, user-input subsystem 1530 can take a variety of forms, such as: a button, keypad, dial, touch screen, audio input interface, visual/image capture input interface, input in the form of sensor data, etc.

Electronic device 1500 can be (or can be included in) any electronic device with at least one network interface. For example, electronic device 1500 may include: a cellular telephone or a smartphone, a tablet computer, a laptop computer, a notebook computer, a personal or desktop computer, a netbook computer, a media player device, a wireless speaker, an IoT device, an electronic book device, a MiFi® device, a smartwatch, a wearable computing device, a portable computing device, a consumer-electronic device, a vehicle, a door, a window, a portal, an access point, a router, a switch, communication equipment, test equipment, as well as any other type of electronic computing device having wireless communication capability that can include communication via one or more wireless communication protocols.

Although specific components are used to describe electronic device 1500, in alternative embodiments, different components and/or subsystems may be present in electronic device 1500. For example, electronic device 1500 may include one or more additional processing subsystems, memory subsystems, networking subsystems, and/or display subsystems. Additionally, one or more of the subsystems may not be present in electronic device 1500. Moreover, in some embodiments, electronic device 1500 may include one or more additional subsystems that are not shown in FIG. 15. In some embodiments, electronic device may include an analysis subsystem that performs at least some of the operations in the communication techniques. Also, although separate subsystems are shown in FIG. 15, in some embodiments some or all of a given subsystem or component can be integrated into one or more of the other subsystems or component(s) in electronic device 1500. For example, in some embodiments program instructions 1522 are included in operating system 1524 and/or control logic 1516 is included in interface circuit 1518.

Moreover, the circuits and components in electronic device 1500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1514. This integrated circuit may include hardware and/or software mechanisms that are used for transmitting wireless signals from electronic device 1500 and receiving signals at electronic device 1500 from other electronic devices. Aside from the mechanisms herein described, radios are generally known in the art and hence are not described in detail. In general, networking subsystem 1514 and/or the integrated circuit can include any number of radios. Note that the radios in multiple-radio embodiments function in a similar way to the described single-radio embodiments.

In some embodiments, networking subsystem 1514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1522, operating system 1524 (such as a driver for an interface circuit in networking subsystem 1514) or in firmware in an interface circuit networking subsystem 1514. Alternatively or additionally, at least some of the operations in the communication techniques may be implemented in a physical layer, such as hardware in an interface circuit in networking subsystem 1514. In some embodiments, the communication techniques are implemented, at least in part, in a MAC layer and/or in a physical layer in an interface circuit in networking subsystem 1514.

While examples of numerical values are provided in the preceding discussion, in other embodiments different numerical values are used. Consequently, the numerical values provided are not intended to be limiting.

Moreover, while the preceding embodiments illustrated the use of wireless signals in one or more bands of frequencies, in other embodiments of the communication techniques electromagnetic signals in one or more different frequency bands are used to determine the range. For example, these signals may be communicated in one or more bands of frequencies, including: a microwave frequency band, a radar frequency band, 900 MHz, 2.4 GHz, 5 GHz, 6 GHz, 60 GHz, and/or a band of frequencies used by a Citizens Broadband Radio Service or by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
a connector or a pad configured to communicatively couple to an antenna; and
an interface circuit, communicatively coupled to the connector or the pad, configured to communicate with a second electronic device, wherein the interface circuit is configured to:
receive, at the connector or the pad, a frame from the second electronic device, wherein the frame comprises information that specifies a maximum uplink multi-user transmit duration of the second electronic device; and
selectively provide, to the connector or the pad, a trigger frame intended for the second electronic device that specifies scheduling of an uplink orthogonal division multiple access (OFDMA) frame or an uplink multiple-input multiple-output (MIMO) frame associated with the second electronic device, wherein the trigger frame is selectively provided when a transmit time corresponding to the uplink OFDMA frame or the uplink MIMO frame is less than or equal to the maximum uplink multi-user transmit duration, and
wherein the electronic device comprises an access point and the second electronic device has a connection with the electronic device.

2. The electronic device of claim 1, wherein, in response to the trigger frame, the interface circuit is configured to receive, at the connector or the pad, the uplink OFDMA frame or the uplink MIMO frame associated with the second electronic device.

3. The electronic device of claim 1, wherein the frame indicates that the maximum uplink multi-user transmit duration comprises a notification that constrains scheduling of the second electronic device by the electronic device for uplink OFDMA communication or uplink MIMO communication.

4. The electronic device of claim 1, wherein, prior to receiving the frame, the interface circuit is configured to provide, to the connector or the pad, a request intended for the second electronic device for the maximum uplink multi-user transmit duration.

5. The electronic device of claim 4, wherein the frame indicates that the maximum uplink multi-user transmit duration is negotiated between the electronic device and the second electronic device.

6. The electronic device of claim 1, wherein the frame indicates that the maximum uplink multi-user transmit duration comprises a suggestion from the second electronic device for the electronic device.

7. The electronic device of claim 1, wherein the frame comprises a media access control (MAC) header that comprises the information.

8. The electronic device of claim 7, wherein the information is included in a control identifier or a command and status (CAS) control.

9. The electronic device of claim 1, wherein the frame comprises a management frame with an action type associated with the maximum uplink multi-user transmit duration.

10. A second electronic device, comprising:
a connector or a pad configured to communicatively couple to an antenna; and
an interface circuit, communicatively coupled to the connector or the pad, configured to communicate with an electronic device, wherein the interface circuit is configured to:
provide, to the connector or the pad, a frame, intended for the electronic device, wherein the frame comprises information that specifies a maximum uplink multi-user transmit duration of the second electronic device; and
selectively receive, at the connector or the pad, a trigger frame from the electronic device that specifies scheduling of an uplink orthogonal division multiple access (OFDMA) frame or an uplink multiple-input multiple-output (MIMO) frame associated with the second electronic device, wherein the trigger frame is selectively received when a transmit time corresponding to the uplink OFDMA frame or the uplink MIMO frame is less than or equal to the maximum uplink multi-user transmit duration, and
wherein the electronic device comprises an access point and the second electronic device has a connection with the electronic device.

11. The second electronic device of claim 10, wherein, in response to the trigger frame, the interface circuit is configured to provide, to the connector or the pad, the uplink OFDMA frame or the uplink MIMO frame intended for the electronic device.

12. The second electronic device of claim 10, wherein the frame indicates that the maximum uplink multi-user transmit duration comprises a notification that constrains scheduling of the second electronic device for uplink OFDMA communication or uplink MIMO communication.

13. The second electronic device of claim 10, wherein, prior to providing the frame, the interface circuit is configured to receive, at the connector or the pad, a request associated with the electronic device for the maximum uplink multi-user transmit duration.

14. The second electronic device of claim 13, wherein the frame indicates that the maximum uplink multi-user transmit duration is negotiated between the electronic device and the second electronic device.

15. The second electronic device of claim 10, wherein the frame indicates that the maximum uplink multi-user transmit duration comprises a suggestion from the second electronic device for the electronic device.

16. The second electronic device of claim 10, wherein the frame comprises a media access control (MAC) header that comprises the information.

17. The second electronic device of claim 16, wherein the information is included in a control identifier or a command and status (CAS) control.

18. The second electronic device of claim 10, wherein the frame comprises a management frame with an action type associated with the maximum uplink multi-user transmit duration.

19. A method for selectively receiving a trigger frame, comprising:
by a second electronic device:
providing a frame, intended for an electronic device, wherein the frame comprises information that specifies a maximum uplink multi-user transmit duration of the second electronic device; and
selectively receiving the trigger frame from the electronic device that specifies scheduling of an uplink orthogonal division multiple access (OFDMA) frame or an uplink multiple-input multiple-output (MIMO) frame associated with the second electronic device, wherein the trigger frame is selectively received when a transmit time corresponding to the uplink OFDMA frame or the uplink MIMO frame is less than or equal to the maximum uplink multi-user transmit duration, and wherein the electronic device comprises an access point and the second electronic device has a connection with the electronic device.

20. The method of claim 19, wherein the frame indicates that the maximum uplink multi-user transmit duration comprises a notification that constrains scheduling of the second electronic device for uplink OFDMA communication or uplink MIMO communication.

* * * * *